(12) United States Patent
Mate (10) Patent No.: US 11,731,690 B2
(45) Date of Patent: Aug. 22, 2023

(54) REDUNDANT STEERING SYSTEM AND MACHINES AND METHODS THEREOF

(71) Applicant: Caterpillar Inc., Peoria, IL (US)

(72) Inventor: Edward William Mate, Manhattan, IL (US)

(73) Assignee: Caterpillar Inc., Peoria, IL (US)

( * ) Notice: Subject to any disclaimer, the term of this patent is extended or adjusted under 35 U.S.C. 154(b) by 329 days.

(21) Appl. No.: 16/788,998

(22) Filed: Feb. 12, 2020

(65) Prior Publication Data

US 2021/0245804 A1 Aug. 12, 2021

(51) Int. Cl.
 *B62D 5/09* (2006.01)
 *B62D 5/30* (2006.01)

(52) U.S. Cl.
 CPC .............. *B62D 5/091* (2013.01); *B62D 5/30* (2013.01)

(58) Field of Classification Search
 CPC ....... E02F 9/225; E02F 9/2292; E02F 9/2296; E02F 9/267; B62D 5/30; B62D 5/091
 See application file for complete search history.

(56) References Cited

U.S. PATENT DOCUMENTS

| | | | |
|---|---|---|---|
| 3,865,211 A | 2/1975 | Liebert et al. | |
| 3,935,918 A | 2/1976 | Hicks et al. | |
| 4,649,705 A * | 3/1987 | Williamson | ............. B62D 5/07 60/420 |
| 6,374,940 B1 * | 4/2002 | Pickert | ................... B62D 7/142 180/405 |
| 7,712,309 B2 * | 5/2010 | Vigholm | ................ E02F 9/2217 60/419 |
| 2008/0006469 A1 * | 1/2008 | Sasaki | .................. B62D 5/0481 180/428 |
| 2008/0104953 A1 | 5/2008 | Vigholm | |

(Continued)

FOREIGN PATENT DOCUMENTS

| | | |
|---|---|---|
| CN | 106494500 | 10/2018 |
| EP | 0 154 388 | 9/1985 |

(Continued)

OTHER PUBLICATIONS

New steering tech for heavy equipment saves fuel, ups efficiency, Sep. 23, 2013, available at https://www.purdue.edu/newsroom/releases/2013/Q3/new-steering-tech-for-heavy-equipment-saves-fuel.-ups-efficiency.html.

*Primary Examiner* — Kevin Hurley
*Assistant Examiner* — Hosam Shabara
(74) *Attorney, Agent, or Firm* — Xsensus, LLP (57) ABSTRACT

A redundant steering system comprises a primary power source; a secondary power source; first and second pumps operatively coupled to the primary and secondary power sources, respectively, to output first and second supplies of hydraulic fluid to a steering cylinder based on operation of the primary and secondary power source, respectively; first and second pairs of selector valves respectively coupled to the first and second pumps; and a charge circuit coupled to respective control inputs of the first and second pairs of selector valves to selectively supply hydraulic fluid to the control inputs of the first and second pairs of selector valves to stop hydraulic fluid from only one of the first pump and the second pump from being provided to the steering cylinder and to provide hydraulic fluid to the steering cylinder from only one of the other of the first pump and the second pump.

20 Claims, 3 Drawing Sheets

(56) References Cited

U.S. PATENT DOCUMENTS

| | | | | |
|---|---|---|---|---|
| 2011/0297473 | A1* | 12/2011 | Krahn | B62D 5/091 |
| | | | | 180/422 |
| 2014/0223898 | A1* | 8/2014 | Iida | F16H 61/427 |
| | | | | 60/491 |
| 2016/0025113 | A1* | 1/2016 | Hiraku | F15B 13/06 |
| | | | | 60/428 |
| 2017/0159678 | A1* | 6/2017 | Peterson | E02F 9/2253 |
| 2018/0119389 | A1* | 5/2018 | Hewitt | E02F 9/2267 |
| 2018/0238028 | A1* | 8/2018 | Akiyama | E02F 9/268 |
| 2019/0061807 | A1 | 2/2019 | Kelber | |
| 2019/0352881 | A1* | 11/2019 | Oasa | B60W 10/103 |
| 2019/0359257 | A1* | 11/2019 | Johnson | E02F 9/2012 |

FOREIGN PATENT DOCUMENTS

| | | |
|---|---|---|
| JP | 2001048029 | 2/2001 |
| JP | 2003314440 | 11/2003 |
| KR | 10-0542607 | 1/2006 |
| KR | 20060000523 | 1/2006 |
| KR | 1020070093650 | 9/2007 |

\* cited by examiner

FIG. 3

REDUNDANT STEERING SYSTEM AND MACHINES AND METHODS THEREOF

TECHNICAL FIELD

The present disclosure relates to a redundant steering system, and machines and methods thereof, particularly redundant meterless electro-hydraulic (EH) steering systems.

BACKGROUND

A conventional meterless EH steering system may not include a control valve for controlling the flow of hydraulic fluid in the steering system, and may instead connect a pump directly to a steering cylinder to provide hydraulic fluid to the steering cylinder. Such steering system may not have a backup means by which to supply hydraulic fluid to the steering cylinder, which can be particularly problematic in a vehicle configured to travel 20 km/hr. or above.

Korean Patent Document KR 10-0542607 ("the KR '607 patent document") describes a power-assisted steering system equipped with a fail-safe. According to the KR '607 patent document, when an issue is detected with a main part fluid supply a supplemental part fluid supply is operated to supply fluid to a steering gear-box connected to a power cylinder. However, the KR '607 patent document is not understood to describe a meterless EH steering system having different selector valve arrangements to selectively control fluid flow through the main part fluid supply and the supplemental part fluid supply.

SUMMARY OF THE DISCLOSURE

In one aspect, the present disclosure provides or implements a redundant meterless electro-hydraulic steering system. The redundant meterless electro-hydraulic steering system can comprise a primary power source, the primary power source being an engine; a secondary power source; a first pump operatively coupled to the primary power source and configured to output a first supply of hydraulic fluid to at least one steering cylinder based on operation of the primary power source; a second pump operatively coupled to the secondary power source and configured to output a second supply of hydraulic fluid to the at least one steering cylinder based on operation of the secondary power source; a first pair of selector valves coupled to the first pump; a second pair of selector valves coupled to the second pump; and a charge circuit coupled to respective control inputs of the first and second pairs of selector valves and configured to selectively supply hydraulic fluid to the control inputs of the first and second pairs of selector valves to stop hydraulic fluid from only one of the first pump and the second pump from being provided to the at least one steering cylinder and to provide hydraulic fluid to the at least one steering cylinder from only one of the other of the first pump and the second pump.

In another aspect, a wheeled machine can be provided or implemented. The wheeled machine can comprise a pair of steering cylinders configured to control steering movement associated with the wheeled machine; a primary power source of the wheeled machine, the primary power source being an engine; a secondary power source; a first variable displacement pump operatively coupled to the primary power source and configured to output a primary supply of hydraulic fluid to the pair of steering cylinders based on operation of the primary power source; a second variable displacement pump operatively coupled to the secondary power source and configured to output a secondary supply of hydraulic fluid to the pair of steering cylinders based on operation of the secondary power source; a first pair of selector valves coupled to the first variable displacement pump; a second pair of selector valves coupled to the second variable displacement pump; and a charge circuit coupled to respective control inputs of the first and second pairs of selector valves and configured to selectively supply hydraulic fluid to the control inputs of the first and second pairs of selector valves to stop hydraulic fluid from only one of the first variable displacement pump and the second variable displacement pump from being supplied to the pair of steering cylinders and to provide hydraulic fluid from only one of the other of the first variable displacement pump and the second variable displacement pump to the pair of steering cylinders. The primary supply of hydraulic fluid and the secondary supply of hydraulic fluid to the pair of steering cylinders can be meterless.

And in another aspect, a method can be implemented, the method comprising providing a primary power source; providing a secondary power source; providing a first variable displacement pump operatively coupled to the primary power source and configured to output a first supply of hydraulic fluid to at least one steering cylinder based on operation of the primary power source; providing a second variable displacement pump operatively coupled to the secondary power source and configured to output a second supply of hydraulic fluid to the at least one steering cylinder based on operation of the secondary power source; providing a first selector valve arrangement coupled to the first variable displacement pump and the second variable displacement pump; providing a second selector valve arrangement coupled to the first variable displacement pump and the second variable displacement pump; and providing a charge circuit coupled to respective control inputs of the first and second selector valve arrangements and configured to selectively supply hydraulic fluid to the control inputs of the first and second selector valve arrangements to stop hydraulic fluid to from only one of the first variable displacement pump and the second variable displacement pump from being provided to the at least one steering cylinder and so hydraulic fluid from only one of the other of the first variable displacement pump and the second variable displacement pump is provided to the at least one steering cylinder based on detection of a fault associated with the primary power source and/or the first variable displacement pump or the secondary power source and/or the second variable displacement pump.

Other features and aspects of this disclosure will be apparent from the following description and the accompanying drawings.

DETAILED DESCRIPTION

The present disclosure relates to a redundant steering system, and machines and methods thereof, particularly redundant meterless electro-hydraulic (EH) steering systems. Electro-hydraulic (EH) steering systems, may be known or referred to as steer-by-wire steering systems.

Figure 1:
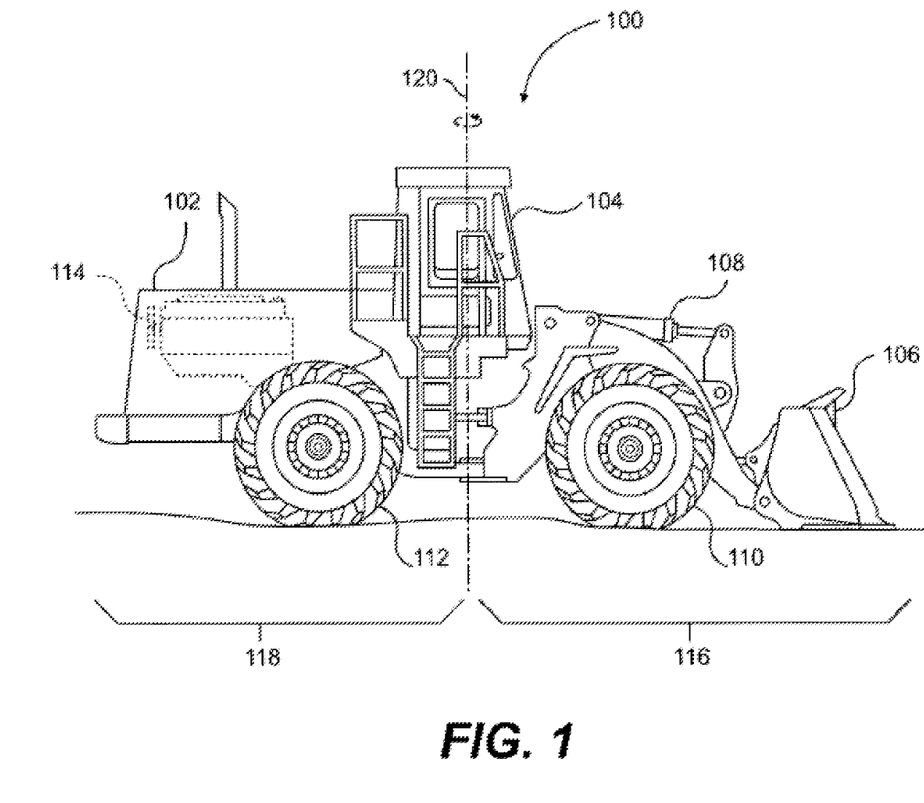
FIG. 1 is a diagrammatic illustration of an exemplary machine.

Referring now to the drawings, FIG. 1 illustrates a side view of a machine 100 according to embodiments of the disclosed subject matter. The machine 100, which may be a work machine, can incorporate an electro-hydraulic steering system as disclosed herein.

The machine 100 may include an engine housing 102, an operator station 104, and a work implement 106, such as a bucket for digging and loading material. In the example of machine 100 being a wheel loader, the work implement 106 can be powered and controlled by a number of actuators, including a tilt actuator 108. The machine 100 may include front and rear ground engaging devices, such as front wheels 110 and rear wheels 112 that support the machine 100. The engine housing 102 may include a power source, such as an engine 114, that may provide power to the front and/or rear wheels 110, 112. According to embodiments of the disclosed subject matter, the machine 100 can travel at 20 km/hr. or above.

To drive the machine 100, an operator may manipulate one or more steering input devices that may be housed within the operator station 104. The input devices may ultimately steer the machine 100 by extending and retracting hydraulic steering actuators or cylinders (not shown in FIG. 1). In the example of machine 100 being a wheel loader, the machine 100 may include a front end 116 and a back end 118. The hydraulic steering actuators may extend between the front and back ends 116, 118 and may be configured to articulate the front end 116 relative to the back end 118 about an articulation axis 120. Though the electro-hydraulic steering system is discussed with reference to an articulating work machine, the principles and system described herein can be equally applicable to a more conventional (Ackermann) hydraulic steering system that may turn the wheels relative to the machine body to steer the machine. Thus, embodiments of the disclosed subject matter can involve machines in the form of wheel loaders, trucks, motor graders, etc.

Figure 2:
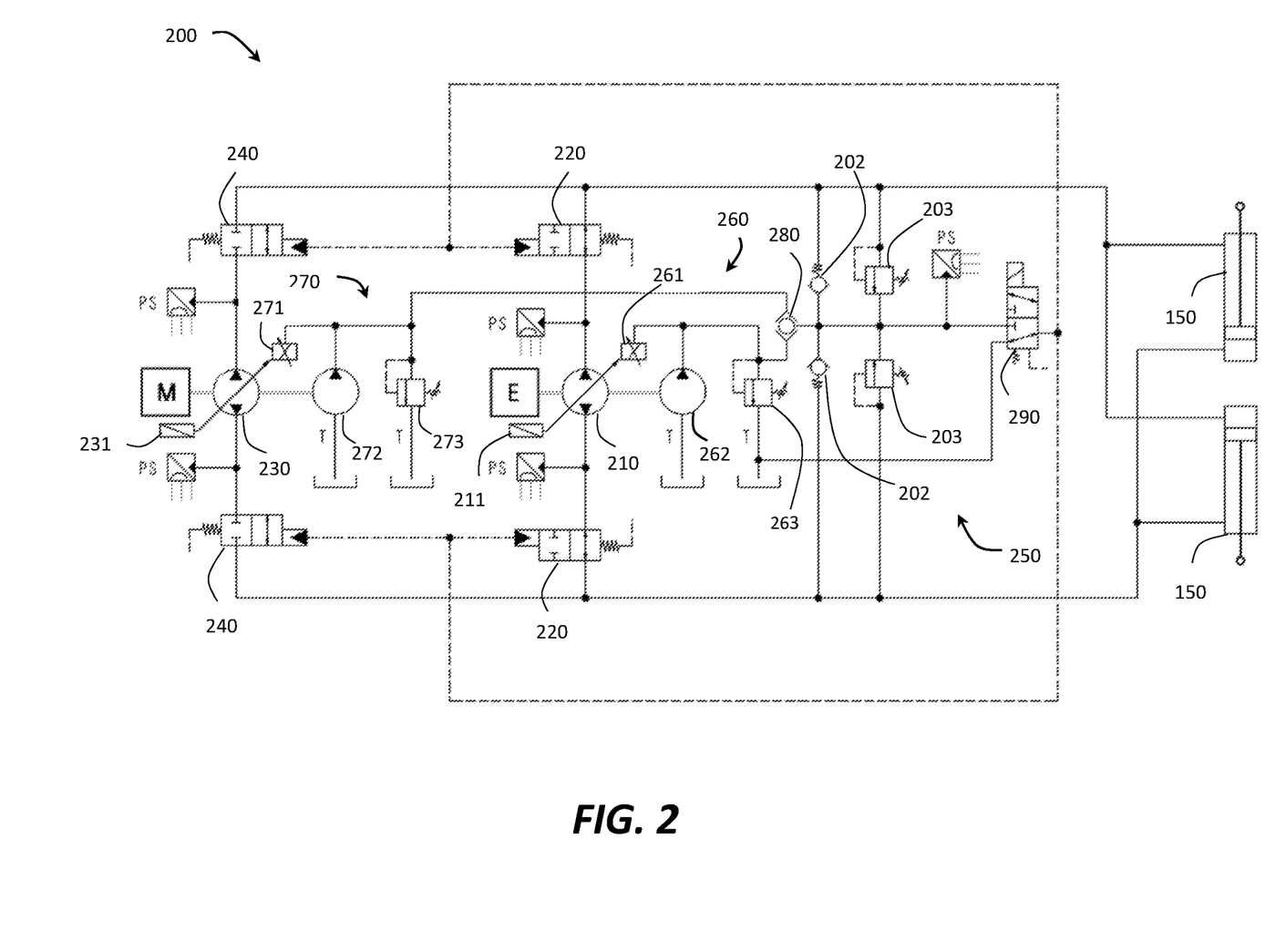
FIG. 2 is a schematic representation of an exemplary electro-hydraulic steering system according to one or more embodiments of the disclosed subject matter.

Turning to FIG. 2, this figure shows a schematic representation of an exemplary electro-hydraulic steering system 200 according to one or more embodiments of the disclosed subject matter, which can be implemented in machines according to embodiments of the disclosed subject matter, such as machine 100. Generally, the steering system 200 can control the supply of hydraulic fluid to and from one or more cylinders 150 to control steering operations of the machine 100.

The system 200 can be comprised of a primary power source E, which can correspond to the engine 114 discussed above, a secondary power source M, a first pump 210, and a second pump 230. The secondary power source M may be a motor (e.g., an electric motor) or a ground-driven power source driven by movement of a drive axle in correspondence with movement of corresponding wheels of the machine 100. Each of the first pump 210 and the second pump 230 can be a variable displacement pump. Optionally, the first pump 210 and the second pump 230 can have the same or substantially the same configuration. Output flow of the first pump 210 and the second pump 230, per revolution based on operation of the primary power source E and the secondary power source M, respectively, can be a function of variable displacement control of the first pump 210 and the second pump 230.

As shown, the first pump 210 can be operatively coupled to the primary power source E, and the second pump 230 can be operatively coupled to the secondary power source M. Operation of the primary power source E can cause the first pump 210 to operate, and operation of the first pump 210 can cause hydraulic fluid (e.g., hydraulic oil) to be output from the first pump 210 (e.g., from either of the ports and received by the other of the ports in the case of a variable displacement pump). Likewise, operation of the secondary power source M can cause the second pump 230 to operate, and operation of the second pump 230 can cause hydraulic fluid (e.g., hydraulic oil) to be output from the second pump 230 (e.g., from either of the ports and received by the other of the ports in the case of a variable displacement pump).

Hydraulic fluid output from the first pump 210 and the second pump 230 may be referred to as a first supply of hydraulic fluid and a second supply of hydraulic fluid, respectively, which may be selectively and optionally exclusively provided to the one or more cylinders 150. Moreover, according to one or more embodiments, the hydraulic fluid output from the first pump 210 may be referred to as a primary supply of hydraulic fluid, and the hydraulic fluid output from the second pump 230 may be referred to as a secondary, or even a supplemental, supply of hydraulic fluid.

The hydraulic fluid output from the first pump 210 and/or the second pump 230 may be provided to the one or more cylinders 150 without being metered by a metering device (e.g., a metering valve). Indeed, the system 200 may not have a metering device between the first pump 210 and/or the second pump 230 and the one or more cylinders 150. Hence, the system 200 may be referred to or characterized as a meterless steering system.

The system 200 can also be comprised of a first selector valve arrangement 220, a second selector valve arrangement 240, and a charge circuit 250. As shown in FIG. 2, each of the first and second selector valve arrangements 220, 240 can have individual selector valves respectively associated with the first and second pumps 210, 230. Optionally, an individual selector valve of one selector valve arrangement can be paired with an individual selector valve of the other selector valve arrangement, for instance, because both selector valves are operatively coupled to the same working portions of the one or more cylinders 150.

The charge circuit 250 can include a first or primary charge subcircuit 260, a second or secondary charge subcircuit 270, and a control valve arrangement 290. Generally, the charge circuit 250 can be configured to selectively couple outputs of the first charge subcircuit 260 and the second charge subcircuit 270, particularly hydraulic fluid thereof, to the control valve arrangement 290 for selective output of the hydraulic fluid by the control valve arrangement 290.

The first charge subcircuit 260 can have an electro-hydraulic actuator 261, a charge pump 262, and a relief valve 263. The first charge subcircuit 260 can be characterized as a low-pressure charge system relative to the pressure of the hydraulic fluid from the first pump 210, because pressure of the hydraulic fluid output by the first charge subcircuit 260 can be less than the pressure of the hydraulic fluid output by the first pump 210.

The charge pump 262 can draw hydraulic fluid from a tank T, and eventually the hydraulic fluid can find its way back to tank T. The charge pump 262, generally speaking, can provide hydraulic fluid for various control aspects of the system 200, including control of the first pump 210. For example, the electro-hydraulic actuator 261 can be operative to control displacement of the first pump 210 based on hydraulic fluid output from the charge pump 262.

The output of the charge pump 262 can also be coupled to the relief valve 263 and an exclusive valve 280. Flow from the charge pump 262 can be routed either to and through the exclusive valve 280 or, if the pressure of the flow exceeds a threshold of the relief valve 263 (e.g., because exclusive valve 280 is blocking flow from the charge pump 262), to and through the relief valve 263 and on to the tank T.

Similarly, the second charge subcircuit 270 can have an electro-hydraulic actuator 271, a charge pump 272, and a relief valve 273. The second charge subcircuit 270 can be characterized as a low-pressure charge system relative to the pressure of the hydraulic fluid from the second pump 230, because pressure of the hydraulic fluid output by the second charge subcircuit 270 can be less than the pressure of the hydraulic fluid output by the second pump 230.

The charge pump 272 can draw hydraulic fluid from the tank T, and eventually the hydraulic fluid can find its way back to tank T. The charge pump 272, generally speaking, can provide hydraulic fluid for various control aspects of the system 200, including control of the second pump 230. For example, the electro-hydraulic actuator 271 can be operative to control displacement of the second pump 230 based on hydraulic fluid output from the charge pump 272.

The output of the charge pump 272 can also be coupled to the relief valve 273 and the exclusive valve 280. Flow from the charge pump 272 can be routed either to and through the exclusive valve 280 or, if the pressure of the flow exceeds a threshold of the relief valve 273 (e.g., because exclusive valve 280 is blocking flow from the charge pump 272), to and through the relief valve 273 and on to the tank T. Optionally, the relief valve 263 and the relief valve 273 can have the same pressure threshold settings. Alternatively, the pressure threshold settings can be different, for instance, one (e.g., the relief valve 263) can be set higher than the other (e.g., the relief valve 273), to prevent toggling between hydraulic fluid flow from the first charge subcircuit 260 and the second charge subcircuit 270 to the control valve arrangement 290.

The exclusive valve 280, which may be referred to as a logic element or a resolver valve, can receive or be coupled to outputs of the first charge subcircuit 260 and the second charge subcircuit 270. An output of the exclusive valve 280 can be provided or coupled to the control valve arrangement 290.

According to one or more embodiments, the exclusive valve 280 can be configured to block or seal off one of the inputs thereto, i.e., from one of the first charge subcircuit 260 or the second charge subcircuit 270, to allow flow of hydraulic fluid from the other of the inputs, i.e., the other of the first charge subcircuit 260 or the second charge subcircuit 270, to the output thereof. The allowed flow can be the flow of hydraulic fluid with the greater pressure of the two flows. For example, the exclusive valve 280 may be comprised of a ball between two passageways that can move, in response to which input provides a higher pressure between the two, to selectively connect one of the inputs to the output thereof and seal off the other of the two inputs to block flow. According to one or more embodiments, the allowed flow can be from the first charge subcircuit 260 or the second charge subcircuit 270 associated with which one of the primary power source E/first pump 210 or the secondary power source M/second pump 230 is currently operating (and hence the charge pump 262 or the charge pump 272, respectively).

The control valve arrangement 290, which in system 200 can be a single control valve, i.e., comprised of only one control valve or consisting of one control valve, can be coupled to the output of the exclusive valve 280. According to one or more embodiments, the control valve arrangement 290 can be in the form of a solenoid valve, for instance, a spring-biased solenoid valve. Hence, the control valve arrangement 290 can be selectively coupled to the first charge subcircuit 260 or the second charge subcircuit 270, depending upon the state of the exclusive valve 280.

Output of the control valve arrangement 290 can be coupled to the tank T or the control inputs of the first selector valve arrangement 220 and the second selector valve arrangement 240, depending upon the state of the control valve arrangement 290. Coupling to the tank T can be in the unpowered state of the control valve arrangement 290, such as shown in FIG. 2, and coupling to the control inputs of the first selector valve arrangement 220 and the second selector valve arrangement 240 can be in the powered or energized state of the control valve arrangement 290 (i.e., upper box moved down to the lower position). Thus, as long as the control valve arrangement 290 is in the unpowered or non-actuated state, the output thereof can be coupled to the tank T, and no hydraulic fluid is output to the control inputs of the first selector valve arrangement 220 and the second selector valve arrangement 240 to actuate the selector valves thereof.

In the energized state, the control valve arrangement 290 can supply hydraulic fluid from either the first charge subcircuit 260 or the second charge subcircuit 270 to the control inputs of the first selector valve arrangement 220 and the second selector valve arrangement 240 (see dashed lines from 290 to 220, 240). As shown in FIG. 2, each of the first selector valve arrangement 220 and the second selector valve arrangement 240 can be comprised of two distinct selector valves. The selector valves of the first selector valve arrangement 220 can be coupled to the first pump 210, particularly respective outputs of the first pump 210. Likewise, the selector valves of the second selector valve arrangement 240 can be coupled to the second pump 230, particularly respective outputs of the second pump 230. Alternatively, each of the first selector valve arrangement 220 and the second selector valve arrangement 240 can be formed of a single selector valve coupled to the first pump 210 and the second pump 230 via respective lines.

Hydraulic fluid from the control valve arrangement 290 to the first selector valve arrangement 220 and the second selector valve arrangement 240 can control respective states of the selector valves of the first and second selector valve arrangements 220, 240 (again, see dashed lines from 290 to 220, 240). That is, providing hydraulic fluid from the control valve arrangement 290 to the first selector valve arrangement 220 and the second selector valve arrangement 240 can cause the respective valves thereof to change states.

The selector valves of the first valve arrangement 220 can be out-of-phase with the selector valves of the second valve arrangement 240. For instance, in the system 200, the selector valves of the first valve arrangement 220 can be open, i.e., allow flow, in an unpowered or rest position, to allow hydraulic fluid from the first pump 210 to flow to the one or more cylinders 150, and the selector valves of the second valve arrangement 240 can be closed, i.e., prevent flow, in an unpowered or rest position, to prevent hydraulic fluid from the second pump 230 from flowing to the one or more cylinders 150. When hydraulic fluid from the control valve arrangement 290 is supplied to the control inputs of the first selector valve arrangement 220 and the second selector valve arrangement 240, i.e., to power the respective selector valves thereof, the states of the respective selector valves can be caused to change from open to closed or from closed to open, depending upon their current state. Thus, the selector valves of the first valve arrangement 220 can be closed and prevent hydraulic fluid from the first pump 210 from flowing to the one or more cylinders 150, and the selector valves of the second valve arrangement 240 can be opened to allow hydraulic fluid from the second pump 230 to be provided to the one or more cylinders 150.

To be clear, the system 200 of FIG. 2 can exclusively provide hydraulic fluid to the one or more cylinders 150 from either the first pump 210 or the second pump 230, the corresponding first selector valve arrangement 220 and the second selector valve arrangement 240 positively allowing hydraulic flow or positively blocking hydraulic flow. Notwithstanding the exclusive providing of hydraulic fluid from the first pump 210 or the second pump 230, optionally, as shown in FIG. 2, a portion of the flow path from the second pump 230 to the one or more cylinders 150 can overlap or be common with a portion of the flow path from the first pump 210 to the one or more cylinders 150, even though hydraulic fluid is provided by only one of the first pump 210 or the second pump 230 at a time to the one or more cylinders 150.

The system 200 can also be comprised of a plurality of check valves 202. According to one or more embodiments, the check valves 202 may be called make-up check valves, having a ball and spring configuration. As shown in FIG. 2, ends of the check valves 202 can be coupled together, to the output of the exclusive valve 280, and to the input of the control valve arrangement 290. Another end of the check valves 202 can be connected to the respective lines leading from the first and second pumps 210, 230 to the one or more cylinders 150.

The system 200 can also be comprised of a plurality of relief valves 203. As shown in FIG. 2, ends of the relief valves 203 can be coupled together, to the output of the exclusive valve 280, and to the input of the control valve arrangement 290. Another end of the relief valves 203 can be connected to the respective lines leading from the first and second pumps 210, 230 to the one or more cylinders 150.

System 200 can also have a plurality of sensors configured to sense or detect operating characteristics of the system 200. For instance, the system 200 can have a plurality of pressure sensors PS. Such sensors can be arranged to detect hydraulic pressure associated with various portions of the system 200, such as hydraulic flow at the outputs of the first and second pumps 210, 230 and at the input to the control valve arrangement 290. System 200 can also include one or more position sensors, such as position sensor 211 and position sensor 231. Position sensor 211 can sense a position of the first pump 210. Likewise, position sensor 231 can sense a position of the second pump 230. More specifically, the position sensors 211, 231 can identify whether the first or second pump 210, 230 is at an expected position. Additionally or alternatively, system 200 can have other types of sensors, such as a debris sensor configured to sense debris from the first pump 210 or the second pump 230.

The sensors can be coupled to electronics, such as control circuitry, a controller or a processor, to determine a fault or failure condition of the system 200. For instance, a low pressure reading from one of the pressure sensors PS may indicate a fault or failure associated with the primary power source E and/or the first pump 210 or the secondary power source M and/or the second pump 230, depending upon where the pressure sensor PS associated with the signal is provided in system 200.

Detection of a fault or failure of the system 200 using the sensors can be used to alert the operator of the machine 100 of the fault or failure and switch hydraulic fluid flow to the one or more cylinders 150 from being provided by the first pump 210 to being provided by the second pump 230. Thus, upon detection of a fault or failure, a control signal can be provided to the control valve arrangement 290 to actuate, which, as noted above, can cause hydraulic fluid to flow from the charge circuit 250 to the control inputs of the first selector valve arrangement 220 and the second selector valve arrangement 240 to stop hydraulic fluid from the first pump 210 from reaching the one or more cylinders 150 and to start providing hydraulic fluid from the second pump 230 to the one or more cylinders 150.

Figure 3:
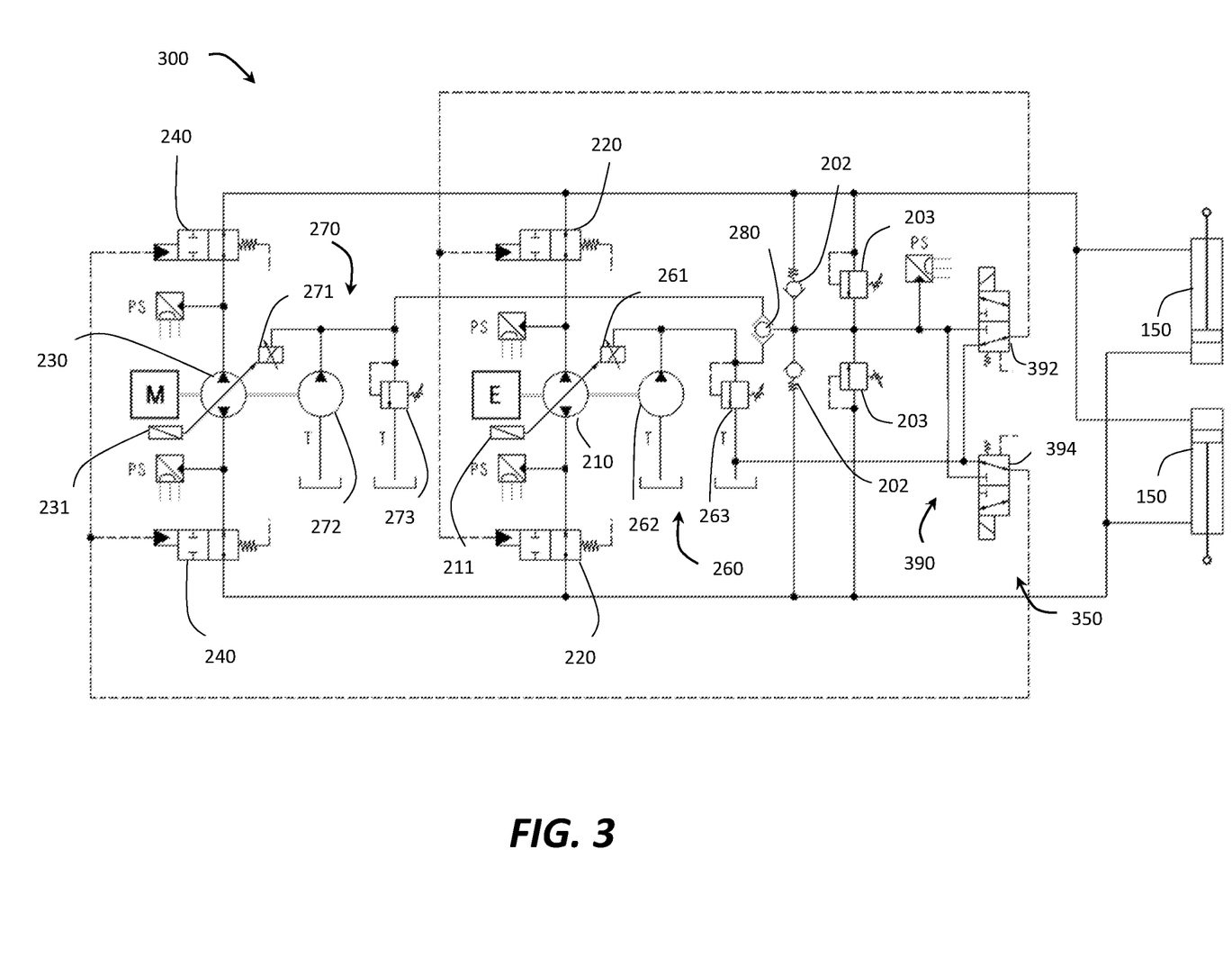
FIG. 3 is a schematic representation of another exemplary electro-hydraulic steering system according to one or more embodiments of the disclosed subject matter.

Turning now to FIG. 3, FIG. 3 shows a schematic representation of an exemplary electro-hydraulic steering system 300 according to one or more embodiments of the disclosed subject matter, which can be implemented in machines according to embodiments of the disclosed subject matter, such as machine 100. Generally, the steering system 300 can control the supply of hydraulic fluid to and from one or more cylinders 150 to control steering operations of the machine 100.

System 300 is similar to system 200 discussed above, but notably may be configured to provide hydraulic fluid from both the first pump 210 and the second pump 230 to the one or more cylinders 150 at the same time. In this regard, a charge circuit 350 can include a control valve arrangement 390 coupled to the control inputs of the first selector valve arrangement 220 and the second selector valve arrangement 240.

Notably, the control valve arrangement 390 can have a first control valve 392 (e.g., a solenoid valve) and a second control valve 394 (e.g., a solenoid valve). Inputs to the first control valve 392 and the second control valve 394 can be from the exclusive valve 280, and an output of each of the first control valve 392 and the second control valve 394 can be to the tank T, particularly when the first control valve 392 and the second control valve 394 are unpowered or in the rest state. As shown in FIG. 3, when the first control valve 392 and the second control valve 394 are in the unpowered or rest state, the first selector valve arrangement 220 and the second selector valve arrangement 240 can be unpowered or in the rest state, hence, open, to allow hydraulic fluid from both the first pump 210 and the second pump 230 to be provided to the one or more cylinders 150. Generally, each of the first pump 210 and the second pump 230, when operating alone, can supply enough hydraulic fluid to operate the one or more cylinders 150 in a secondary or safety steering mode. According to one or more embodiments, each of the first pump 210 and the second pump 230 can provide one-half the total amount of hydraulic fluid needed to control the one or more cylinders 150 in a normal operating mode. Alternatively, the first pump 210, in the form of a primary pump 210, can provide more than one-half (e.g., 60%) the amount of hydraulic fluid needed to control the one or more cylinders 150.

Should one of the first pump 210 or the second pump 230 (or associated components thereof) develop a fault or failure, the system 300 can detect such fault or failure using sensors, such as one or more pressure sensors PS, and send a control signal to power one of the first control valve 392 or the second control valve 394 and thereby provide hydraulic fluid from the charge circuit 350 to the corresponding first selector valve arrangement 220 or second selector valve arrangement 240 to close and stop hydraulic fluid from being provided to the one or more cylinders 150. The other of the first control valve 392 or the second control valve 394 can remain unpowered or in the rest state to continue providing hydraulic fluid to the one or more cylinders 150.

INDUSTRIAL APPLICABILITY

As noted above, the present disclosure relates to a redundant steering system, and machines and methods thereof, particularly redundant meterless electro-hydraulic (EH) steering systems.

Such systems and methods can be implemented in machines, such as machine 100, to meet certain industry requirements, such as standard ISO 5010, as such standard pertains to machine speed (e.g., 20 km/hr.), fail operational, and providing a redundant steering system. Embodiments of the disclosed subject matter can also improve efficiency, by detecting steering system failures or faults and switching to a backup steering configuration either by shutting off hydraulic fluid flow associated with a primary power source in favor of hydraulic fluid flow associated with a secondary power source, or by shutting off hydraulic fluid flow associated with the faulty or failed power source and leaving hydraulic fluid flow associated with a non-faulty or failed power source.

Thus, embodiments of the disclosed subject matter can be comprised of the primary power source E, the secondary power source M, the first pump 210, and the second pump 230. Output flow of the first pump 210 and the second pump 230, per revolution based on operation of the primary power source E and the secondary power source M, respectively, can be a function of variable displacement control of the first pump 210 and the second pump 230. The system 200, 300 can also be comprised of a first selector valve arrangement 220, a second selector valve arrangement 240, and a charge circuit 250, 350. The charge circuit 250, 350 can include a first or primary charge subcircuit 260, a second or secondary charge subcircuit 270, and a control valve arrangement 290, 390. Generally, the charge circuit 250, 350 can be configured to selectively couple outputs of the first charge subcircuit 260 and the second charge subcircuit 270, particularly hydraulic fluid thereof, to the control valve arrangement 290, 390 for selective output of the hydraulic fluid by the control valve arrangement 290, 390.

Output of the control valve arrangement 290, 390 can be coupled to the tank T or the control inputs of the first selector valve arrangement 220 and the second selector valve arrangement 240, depending upon the state of the control valve arrangement 290, 390. Coupling to the tank T can be in the unpowered state of the control valve arrangement 290, 390, and coupling to the control inputs of the first selector valve arrangement 220 and the second selector valve arrangement 240 can be in the powered or energized state of the control valve arrangement 290, 390. Thus, as long as the control valve arrangement 290, 390 is in the unpowered or non-actuated state, the output thereof can be coupled to the tank T, and no hydraulic fluid is output to the control inputs of the first selector valve arrangement 220 and the second selector valve arrangement 240 to actuate the selector valves thereof.

In the energized state, the control valve arrangement 290, 390 can supply hydraulic fluid from either the first charge subcircuit 260 or the second charge subcircuit 270 to the control inputs of the first selector valve arrangement 220 and/or the second selector valve arrangement 240, depending upon whether the system 200 of FIG. 2 or the system 300 of FIG. 3. Hydraulic fluid from the control valve arrangement 290, 390 to the first selector valve arrangement 220 and/or the second selector valve arrangement 240 can control respective states of the selector valves of the first and second selector valve arrangements 220, 240. That is, providing hydraulic fluid from the control valve arrangement 290, 390 to the first selector valve arrangement 220 and/or the second selector valve arrangement 240 can cause the respective valves thereof to change states. According to FIG. 2, the first selector valve arrangement 220 can be powered so as to close the corresponding selector valves and stop flow from the first pump 210, and the second selector valve arrangement 240 can be powered so as to open the corresponding selector valves to begin providing hydraulic fluid flow from the second pump 230. According to FIG. 3, both of the first and second selector valve arrangements 220, 240 can be initially open to pass hydraulic fluid from the first pump 210 and the second pump 230, respectively, and then one of the first or second selector valve arrangements 220, 240 can be powered by one of the first control valve 392 or the second control valve 394 of the control valve arrangement 390 to close the corresponding selector valves of the first or second selector valve arrangements 220, 240 to block hydraulic fluid from the first pump 210 or the second pump 230.

Regarding operation of the check valves 202, if the one or more cylinders 150 are moving in a manner such that the flow from the first pump 210 or the second pump 230 is not keeping up with the movement, the pressure of the supply of hydraulic fluid to the one or more cylinders 150 may drop and potentially pull a void. The check valve 202 can be configured to maintain the pressure in the supply line to the one or more cylinders 150 such that the pressure does not drop below (including does not stay below) the pressure of the hydraulic fluid of the charge circuit 250, 350. In this regard, the pressure of the charge circuit 250, 350 can cause the check valve 202 to open if the pressure in the supply line to the one or more cylinders 150 goes or tries to go lower than the pressure of the charge circuit 250, 350. The charge circuit 250, 350 can thus make up the hydraulic fluid necessary in an effort to prevent the one or more cylinders 202 from pulling a void. On the other hand, if for some reason a structure (e.g., ground) is forcing the steering linkage which is in turn forcing the one or more cylinders 150 to want to move faster than the amount of hydraulic fluid available from the first pump 210 and/or the second pump 230, then the supplemental hydraulic fluid can be provided from the charge circuit 250, 350 via the check valve 202.

Regarding operation of the relief valves 203, if the linkage is resisting the pressure of the hydraulic fluid from the first pump 210 and/or the second pump 230, each of the relief valves 203 can allow for hydraulic fluid to flow from the supply line to the one or more cylinders 150 should the pressure in such line reach a predetermined threshold value.

Sensors, such as pressure sensors PS and position sensors 211, 231, can be arranged to detect faults or failures associated with providing hydraulic fluid to the one or more cylinders 150. Such sensors can be coupled to electronics, such as control circuitry, a controller or a processor, to determine a fault or failure condition of the system 200, 300. For instance, a low pressure reading from one of the pressure sensors PS may be processed by the electronics to identify a fault or failure associated with the primary power source E and/or the first pump 210 or the secondary power source M and/or the second pump 230, depending upon the location of the sensor(s).

Detection of a fault or failure using the sensors can be used to alert the operator of the machine 100 of the fault or failure and control hydraulic fluid flow to the one or more cylinders 150 by selectively closing the selector valves of the first or second selector valve arrangements 220, 240, depending upon whether the system 200 of FIG. 2 or the system 300 of FIG. 3. Such closing of the selector valves of the first or the second selector valve arrangements 220, 240 can be to block hydraulic fluid from the first or second pumps 210, 230. Thus, upon detection of a fault or failure, a control signal can be provided to the control valve arrangement 290, 390 to actuate, which can cause hydraulic fluid to flow from the charge circuit 250, 350 to the control inputs of the first selector valve arrangement 220 and/or the second selector valve arrangement 240 to stop hydraulic fluid from the first pump 210 or the second pump 230 from reaching the one or more cylinders 150.

Optionally, the system 200 may periodically send control signals to the control valve arrangement 290 to toggle between which of the first pump 210 or the second pump 230 provides hydraulic fluid to the one or more cylinders 150, even if no fault is detected in the system 200, as a means by which to test redundancy operability for providing hydraulic fluid from the second pump 230 to the one or more cylinders 150. After performing the redundancy test, the system 200 can switch back to hydraulic fluid being provided to the one or more cylinders 150 by the first pump 210. The system 300 may likewise periodically shut off one supply from one of the first pump 210 or the second pump 230 for testing purposes.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A wheeled machine comprising:
    a pair of steering cylinders configured to control steering movement associated with the wheeled machine;
    a primary power source of the wheeled machine;
    a secondary power source;
    a first variable displacement pump operatively coupled to the primary power source and configured to output a primary supply of hydraulic fluid to the pair of steering cylinders based on operation of the primary power source;
    a second variable displacement pump operatively coupled to the secondary power source and configured to output a secondary supply of hydraulic fluid to the pair of steering cylinders based on operation of the secondary power source;
    a first pair of selector valves coupled to the first variable displacement pump;
    a second pair of selector valves coupled to the second variable displacement pump; and
    a charge circuit coupled to respective control inputs of the first and second pairs of selector valves and configured to selectively supply hydraulic fluid to the control inputs of the first and second pairs of selector valves to stop hydraulic fluid from only one of the first variable displacement pump and the second variable displacement pump from being supplied to the pair of steering cylinders and to provide hydraulic fluid from only one of the other of the first variable displacement pump and the second variable displacement pump to the pair of steering cylinders,
    wherein the primary supply of hydraulic fluid and the secondary supply of hydraulic fluid to the pair of steering cylinders are meterless,
    wherein the charge circuit includes:
    a primary charge sub circuit having a first charge pump,
    a secondary charge subcircuit having a second charge pump, and
    a control valve arrangement coupled to the control inputs of the first and second pairs of selector valves and selectively coupled to respective outputs of the primary charge subcircuit and the secondary charge subcircuit via an exclusive valve between the primary charge subcircuit and the secondary charge subcircuit.

2. The wheeled machine according to claim 1, wherein the charge circuit is operative to supply the hydraulic fluid to the control inputs of the first pair of selector valves to close the first pair of selector valves to stop hydraulic fluid from the first variable displacement pump from being provided to the pair of steering cylinders responsive to a control signal provided to the control valve arrangement thereof, the control signal being generated upon detection, by one or more sensors, of a fault associated with the primary power source and/or the first variable displacement pump.

3. The wheeled machine according to claim 2, wherein the charge circuit is operative to supply hydraulic fluid to the control inputs of the second pair of selector valves to open the second pair of selector valves to start providing hydraulic fluid from the second variable displacement pump to the pair of steering cylinders responsive to the control signal provided to the control valve arrangement.

4. The wheeled machine according to claim 3, wherein the control valve arrangement has only one control valve, said only one control valve having an output coupled to the control inputs of the first and second pairs of selector valves.

5. The wheeled machine according to claim 2, wherein the charge circuit is operative to maintain the second pair of selector valves open to continue to provide hydraulic fluid to the pair of steering cylinders from the second variable displacement pump.

6. The wheeled machine according to claim 2, wherein the control valve arrangement has two control valves, a first control valve coupled to the control inputs of the first pair of selector valves and a second control valve coupled to the control inputs of the second pair of selector valves.

7. The wheeled machine according to claim 2, wherein the charge circuit is operative to supply hydraulic fluid to the control inputs of the second pair of selector valves to close the second pair of selector valves to stop hydraulic fluid from the second variable displacement pump from being provided to the pair of steering cylinders responsive to a control signal provided to the control valve arrangement, the control signal being generated upon detection, by one or more sensors, of a fault associated with the secondary power source and/or the second variable displacement pump.

8. The wheeled machine according to claim 2, wherein the secondary power source is an electric motor or a ground-driven power source driven by movement of a drive axle of the wheeled machine.

9. A redundant meterless electro-hydraulic steering system comprising:
    a primary power source;

a secondary power source;
a first pump operatively coupled to the primary power source and configured to output a first supply of hydraulic fluid to at least one steering cylinder based on operation of the primary power source;
a second pump operatively coupled to the secondary power source and configured to output a second supply of hydraulic fluid to the at least one steering cylinder based on operation of the secondary power source;
a first pair of selector valves coupled to the first pump;
a second pair of selector valves coupled to the second pump; and
a charge circuit coupled to respective control inputs of the first and second pairs of selector valves and configured to selectively supply hydraulic fluid to the control inputs of the first and second pairs of selector valves to stop hydraulic fluid from only one of the first pump and the second pump from being provided to the at least one steering cylinder and to provide hydraulic fluid to the at least one steering cylinder from only one of the other of the first pump and the second pump,
wherein the charge circuit includes:
a primary charge sub circuit having a first charge pump,
a secondary charge subcircuit having a second charge pump, and
a control valve arrangement coupled to the control inputs of the first and second pairs of selector valves and selectively coupled to respective outputs of the primary charge subcircuit and the secondary charge subcircuit via an exclusive valve.

10. The redundant meterless electro-hydraulic steering system according to claim 9, wherein the control valve arrangement has only one control valve, said only one control valve having an output coupled to the control inputs of the first and second pairs of selector valves.

11. The redundant meterless electro-hydraulic steering system according to claim 10, wherein said only one control valve is controllable to provide hydraulic fluid to the first pair of selector valves to close the first pair of selector valves responsive to a control signal provided thereto, the control signal being generated upon detection, by one or more sensors, of a fault associated with the primary power source and/or the first pump.

12. The redundant meterless electro-hydraulic steering system according to claim 9, wherein the control valve arrangement has two control valves, a first control valve coupled to the control inputs of the first pair of selector valves and a second control valve coupled to the control inputs of the second pair of selector valves.

13. The redundant meterless electro-hydraulic steering system according to claim 12, wherein the first control valve and the second control valve are controllable to exclusively close the first pair of selector valves or the second pair of selector valves, respectively, in response to detection of a fault associated with the primary power source and/or the first pump or the secondary power source and/or the second pump, respectively.

14. The redundant meterless electro-hydraulic steering system according to claim 9, wherein the selective supply of the hydraulic fluid to the control inputs to stop hydraulic fluid from only one of the first pump and the second pump from being provided to the at least one steering cylinder and to provide hydraulic fluid to the at least one steering cylinder from only one of the other of the first pump and the second pump is performed responsive to a detected fault in the redundant meterless electrohydraulic steering system.

15. The redundant meterless electro-hydraulic steering system according to claim 9,
wherein a secondary hydraulic fluid path to the at least one steering cylinder includes the second pair of selector valves,
wherein a primary hydraulic fluid path to the at least one steering cylinder includes the first pair of selector valves, and
wherein the secondary hydraulic fluid path and the primary hydraulic fluid path have a common fluid path portion.

16. The wheeled machine according to claim 1, wherein the primary power source is an engine.

17. The wheeled machine according to claim 1, wherein the primary power source is separate from the secondary power source.

18. The redundant meterless electro-hydraulic steering system according to claim 9, wherein the primary power source is an engine.

19. A redundant meterless electro-hydraulic steering system comprising:
a primary power source;
a secondary power source, the secondary power source being separate from the primary power source;
a first pump operatively coupled to the primary power source and configured to output a first supply of hydraulic fluid to at least one steering cylinder based on operation of the primary power source;
a second pump operatively coupled to the secondary power source and configured to output a second supply of hydraulic fluid to the at least one steering cylinder based on operation of the secondary power source;
a first pair of selector valves coupled to the first pump;
a second pair of selector valves coupled to the second pump; and
a charge circuit coupled to respective control inputs of the first and second pairs of selector valves and configured to selectively supply hydraulic fluid to the control inputs of the first and second pairs of selector valves to stop hydraulic fluid from only one of the first pump and the second pump from being provided to the at least one steering cylinder and to provide hydraulic fluid to the at least one steering cylinder from only one of the other of the first pump and the second pump,
wherein the charge circuit includes:
a primary charge subcircuit having a first charge pump,
a secondary charge subcircuit having a second charge pump, and
a control valve arrangement coupled to the control inputs of the first and second pairs of selector valves and selectively coupled to respective outputs of the primary charge subcircuit and the secondary charge subcircuit via an exclusive valve.

20. The redundant meterless electro-hydraulic steering system according to claim 19, wherein the secondary power source is an electric motor or a ground-driven power source driven by movement of a drive axle of a machine upon which the redundant meterless electro-hydraulic steering system is disposed.

* * * * *